United States Patent
Lu et al.

(10) Patent No.: US 12,175,321 B2
(45) Date of Patent: Dec. 24, 2024

(54) CARD READER AUXILIARY DEVICE AND WORKING METHOD THEREOF

(71) Applicant: FEITIAN TECHNOLOGIES CO., LTD., Beijing (CN)

(72) Inventors: Zhou Lu, Beijing (CN); Huazhang Yu, Beijing (CN)

(73) Assignee: FEITIAN TECHNOLOGIES CO., LTD., Beijing (CN)

( * ) Notice: Subject to any disclaimer, the term of this patent is extended or adjusted under 35 U.S.C. 154(b) by 19 days.

(21) Appl. No.: 18/040,481

(22) PCT Filed: Nov. 23, 2021

(86) PCT No.: PCT/CN2021/132579
§ 371 (c)(1),
(2) Date: Feb. 3, 2023

(87) PCT Pub. No.: WO2022/142873
PCT Pub. Date: Jul. 7, 2022

(65) Prior Publication Data
US 2023/0274105 A1    Aug. 31, 2023

(30) Foreign Application Priority Data
Dec. 31, 2020 (CN) .......................... 202011619740.5

(51) Int. Cl.
*G06K 7/10* (2006.01)

(52) U.S. Cl.
CPC ..... *G06K 7/10128* (2013.01); *G06K 7/10297* (2013.01)

(58) Field of Classification Search
CPC .................. G06K 7/10128; G06K 7/10297
(Continued)

(56) References Cited

U.S. PATENT DOCUMENTS 6,296,182 B1* 10/2001 Ota ........................... G07F 7/04
235/492
9,852,412 B1* 12/2017 Post ..................... G06Q 20/204
(Continued)

FOREIGN PATENT DOCUMENTS

CN    103310170 A    9/2013
CN    106682554 A    5/2017
(Continued)

OTHER PUBLICATIONS

Office Action issued on Feb. 9, 2021, in corresponding Chinese Application No. 202011619740.5, 11 pages.
(Continued)

*Primary Examiner* — Allyson N Trail
(74) *Attorney, Agent, or Firm* — Maier & Maier, PLLC

(57) ABSTRACT

A card reader auxiliary device and a working method thereof, which relate to the field of card readers. The card reader auxiliary device detects whether a card exists based on contactless field of the card reader, when detecting that the card exists, the card reader auxiliary device opens its own contactless field and provides field strength enough for a fingerprint card to enable the fingerprint card to complete fingerprint comparison, the card reader auxiliary device obtains a current time of a timer, determines whether the current time is more than a first preset time, if yes, the card reader auxiliary device closes its own contactless field. According to the embodiments, the fingerprint comparison can be done by a card without updating the card reader, which can make the card communicate smoothly with the card reader.

18 Claims, 6 Drawing Sheets

(58) Field of Classification Search
USPC .......................................................... 235/451
See application file for complete search history.

(56) References Cited

U.S. PATENT DOCUMENTS

| | | | |
|---|---|---|---|
| 2008/0186167 A1* | 8/2008 | Ramachandra .... | G06Q 10/0875 |
| | | | 340/572.1 |
| 2010/0049977 A1* | 2/2010 | Kanemoto ........... | G06Q 20/341 |
| | | | 713/169 |
| 2015/0347329 A1* | 12/2015 | Lu ........................... | H04W 4/80 |
| | | | 710/302 |
| 2016/0321533 A1* | 11/2016 | Thill ................... | G06K 19/0705 |
| 2017/0140180 A1* | 5/2017 | Hoson ...................... | G06K 7/08 |
| 2020/0112340 A1* | 4/2020 | Roh ....................... | H04W 76/14 |
| 2021/0097807 A1* | 4/2021 | Higgins .............. | G07F 17/3239 |
| 2022/0284178 A1* | 9/2022 | Rule ....................... | G06F 21/35 |

FOREIGN PATENT DOCUMENTS

| | | |
|---|---|---|
| CN | 108629172 A | 10/2018 |
| CN | 111541038 A | 8/2020 |
| CN | 112307783 A | 2/2021 |
| CN | 213751094 U | 7/2021 |
| KR | 1020090117193 A | 11/2009 |

OTHER PUBLICATIONS

Notice of Allowance issued on Apr. 1, 2021, in corresponding Chinese Application No. 202011619740.5, 4 pages.
International Search Report and Written Opinion issued on Jan. 28, 2022, in corresponding International Application No. PCT/CN2021/132579, 20 pages.

* cited by examiner

CARD READER AUXILIARY DEVICE AND WORKING METHOD THEREOF

CROSS-REFERENCE TO RELATED APPLICATIONS

This application is a national stage of International Application No. PCT/CN2021/132579, filed on Nov. 23, 2021, which claims priority to Chinese Patent Application No. 202011619740.5, filed to China National Intellectual Property Administration on Dec. 31, 2020, and entitled "Card Reader Auxiliary Device and Working Method thereof". Both of the aforementioned applications are hereby incorporated by reference in their entireties.

TECHNICAL FIELD

The present application relates to the field of card reader, and in particular, to a card reader auxiliary device and a working method thereof.

BACKGROUND

Card reader is a kind of device for card reading. According to different types of cards, the card reader may be an integrated circuit (IC) card reader. The IC card includes a contact IC card and a contactless IC card. At present, a contactless card reader is widely used in the field related to identity authentication, for example, the contactless card reader works with a fingerprint card to complete user identity authentication. However, in a process of invention, inventor finds disadvantages of the existing authentication method. The disadvantages are: because an authentication process performed by the contactless card reader and the fingerprint card is completed based on obtaining power from contactless field strength. When a time interval of field strength generated by the contactless card reader is long or field strength generated by the card reader is weak, the requirement of the fingerprint card is not met, therefore, secure authentication cannot be performed.

SUMMARY

In order to solve defection of the prior art, embodiments of the present application provide a card reader auxiliary device and a working method thereof. The card reader auxiliary device depends on a card reader, which is used for providing contactless field for the fingerprint card in an interacting process between the fingerprint card and the card reader, which makes the fingerprint card obtain enough electric energy to perform fingerprint comparison.

In an aspect, an embodiment of the present application provides a working method of a card reader auxiliary device, where the card reader auxiliary device depends on a card reader. The method includes:
step S1, the card reader auxiliary device detects whether a card exists based on contactless field of the card reader, when detecting that the card exists, the card reader auxiliary device activates a timer and opens its own contactless field;
step S2, the card reader auxiliary device obtains a current time of the timer, determines whether the current time is more than a first preset time, if yes, executes step S3; otherwise, goes back to execute step S2; and
step S3, the card reader auxiliary device closes its own contactless field.

Optionally, before the card reader auxiliary device obtains the current time of the timer in step S2, the method further includes: the card reader auxiliary device determines whether data of a fingerprint comparing result returned from a fingerprint card is received, if yes, executes step S3; otherwise, executes step S2.

Optionally, before the card reader auxiliary device determines whether the data of the fingerprint comparing result returned from the fingerprint card is received in step S2, the method further includes: the card reader auxiliary device sends a fingerprint comparing result obtaining instruction to the fingerprint card.

At another aspect, an embodiment of the present disclosure provides a card reader auxiliary device. The device includes:
a detecting module, configured to detect whether a card exists based on contactless field of a card reader;
an activating module, configured to activate a timer in case that the detecting module detects that the card exists and open contactless field of the card reader auxiliary device;
a determining module including a first determining unit;
the first determining unit is configured to obtain a time of the timer, determine whether the time of the timer is more than a first preset time; and
a closing module, configured to close contactless field of the card reader auxiliary device in case that the determining module determines that the time of the timer is equal to the first preset time.

Optionally, the determining module specifically further includes: a second determining unit;
the second determining unit is configured to determine whether the data of the fingerprint comparing result returned from a fingerprint card is received; and
the closing module is further configured to close contactless field of the card reader auxiliary device in case that the second determining unit determines that the data of the fingerprint comparing result returned from the fingerprint card is received.

Optionally, the device further includes a sending module, configured to send a fingerprint comparing result obtaining instruction to the fingerprint card.

In a third aspect, an embodiment of the present application provides a card reader auxiliary device. The device includes:
a detector, configured to detect whether a card exists based on contactless field of a card reader;
a processor, configured to activate a timer in case that the detector detects that the card exists, and open contactless field of the card reader auxiliary device;
where the processor is further configured to obtain a time of the timer, and determine whether the time of the timer is more than a first preset time; and
the processor is further configured to close the contactless field of the card reader auxiliary device in case of determining that the time of the timer is more than the first preset time.

The beneficial effect of the technical solutions provided by the embodiments of the present application are: in the present application, the card reader auxiliary device determines whether a fingerprint card exists via detecting contactless field of the card reader, when the fingerprint card exists, the card reader auxiliary device opens contactless field to provide enough field strength for the fingerprint card, which makes the fingerprint card complete fingerprint comparison and communicate with the card reader smoothly; according to the present application, the card reader can complete fingerprint comparison without being updated and the communication with the card is valid; therefore, the field strength of the card reader is enhanced indirectly and the communication is safer.

DETAILED DESCRIPTION OF THE EMBODIMENTS

In order to make the purpose, the technical solutions and the advantages of the present application clearer, the technical solutions in the embodiments of the present application will be clearly and completely described in the following with reference to the accompanying drawings in the embodiments of the present application. It is obvious that the described embodiments are only a part of the embodiments of the present application, but not all the embodiments. All other embodiments obtained by those skilled in the art based on the embodiments of the present application without creative efforts are within the protection scope of the present application.

Embodiment 1

Embodiment 1 of the present application provides a working method of a card reader auxiliary device, where the card reader auxiliary device depends on a card reader and is used to provide contactless field to a fingerprint card during an interaction between the fingerprint card and the card reader, which can make the fingerprint card obtain enough electric energy for performing fingerprint comparison.

Figure 1:
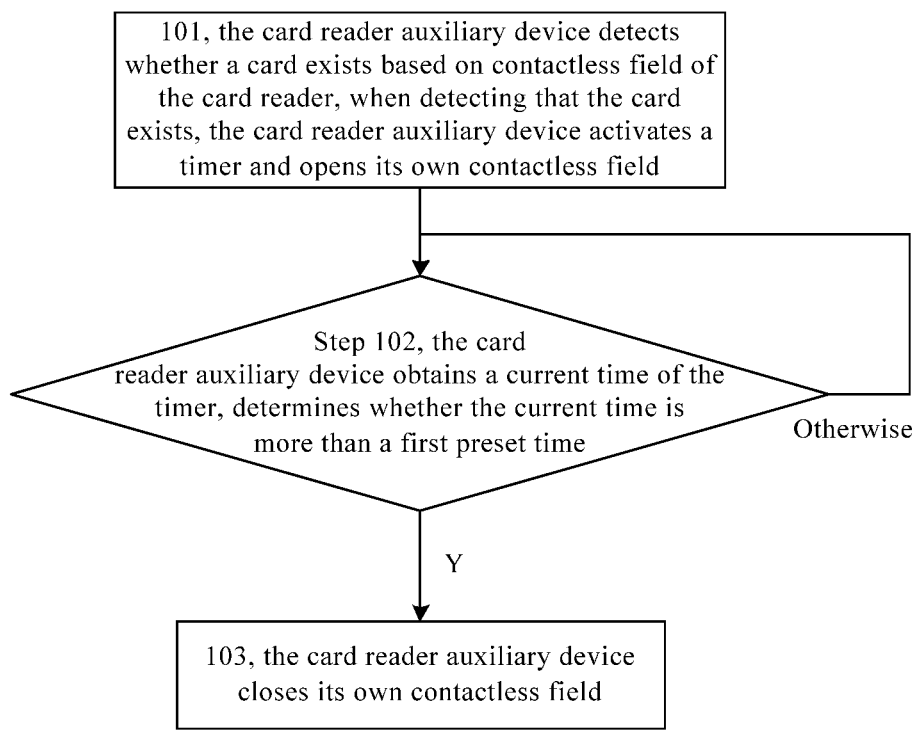
FIG. 1 is a flowchart of a working method of a card reader auxiliary device provided by Embodiment 1 of the present application.

As shown in FIG. 1, the method includes:

step 101, the card reader auxiliary device detects whether a card exists based on contactless field of the card reader, when detecting that the card exists, the card reader auxiliary device activates a timer and opens its own contactless field;

step 102, the card reader auxiliary device obtains a current time of the timer, determines whether the current time is more than a first preset time, if yes, executes step 103; otherwise, goes back to execute step 102; and step 103, the card reader auxiliary device closes its own contactless field.

Optionally, before the card reader auxiliary device obtains the current time of the timer in step 102, the method further includes: the card reader auxiliary device determines whether data of a fingerprint comparing result returned from a fingerprint card is received, if yes, executes step 103; otherwise, executes step 102.

Preferably, before the card reader auxiliary device determines whether the data of the fingerprint comparing result returned from the fingerprint card is received in step 102, the method further includes: the card reader auxiliary device sends a fingerprint comparing result obtaining instruction to the fingerprint card.

Optionally, when the card reader auxiliary device determines that the current time is more than the first preset time, the method further includes: the card reader auxiliary device determines whether a heartbeat packet returned from a fingerprint card is received, if yes, resets the timer, goes back to step 102; otherwise, closes its own contactless field.

Preferably, before the card reader auxiliary device determines whether the heartbeat packet returned from the fingerprint card is received, the method further includes: the card reader auxiliary device sends a heartbeat packet request to the fingerprint card.

Optionally, step 103 further includes: determine whether the card is out of field, if yes, close contactless field of the card reader auxiliary device.

Optionally, step 103 further includes:

step a1, the card reader auxiliary device activates a second timer;

step a2, the card reader auxiliary device determines whether a result of communicating with the card reader returned from a fingerprint card is received, if yes, closes its own contactless field, otherwise, executes step a3; and step a3, the card reader auxiliary device obtains a current time of the second timer, determines whether the current time of the second timer is more than a second preset time, if yes, closes its own contactless field; otherwise, executes step a2.

Preferably, step a1 further includes: the card reader auxiliary device weakens its own contactless field.

Optionally, after the card reader auxiliary device closes its own contactless field, the method further includes: the card reader auxiliary device obtains a time of the timer, determines whether the time of the timer is equal to a preset waiting time period, if yes, procedure is ended; otherwise, keeps waiting till reaches the preset waiting time period.

Preferably, before the card reader auxiliary device obtains the time of the timer, the method further includes: the card reader auxiliary device detects whether a card exists, in case that the card reader auxiliary device detects that the card exists, the card reader auxiliary device obtains the time of the timer.

Optionally, the card reader auxiliary device detects whether the card exists specifically includes: the card reader auxiliary device determines whether the card exists by sensing change of contactless field strength of the card reader or the card reader auxiliary device detects whether the card exists via electrode circuit.

Preferably, the card reader auxiliary device determines whether the card exists by sensing change of the contactless field strength of the card reader specifically is: the card reader auxiliary device generates alternating current through a way which is that the contactless coil in the card reader auxiliary device induces contactless field generated by the card reader, converts the alternating current to direct current, measures voltage value of the card reader auxiliary device, determines whether the voltage value conforms with a first preset category, if yes, the card reader auxiliary device determines that a card exists, otherwise, the card reader auxiliary device determines that a card does not exist.

Preferably, the card reader auxiliary device detects whether a card exists by detecting electrode circuit specifically is: the card reader auxiliary generates alternating current through a way which is that the contactless coil in the card reader auxiliary device induces contactless field generated by the card reader, detects whether change of the alternating current happens via electrode circuit, if change happens, the card reader auxiliary device determines that a card exists; otherwise, the card reader auxiliary device determines that a card does not exist.

Preferably, before the card reader auxiliary device determines whether a card exists by sensing change of the contactless field strength of the card reader, the method further includes: the card reader auxiliary device initializes a timer, sets interruption condition of the timer, when the interruption condition of the timer is met, the card reader auxiliary device determines whether a card exists by sensing change of the field strength of the card reader.

Optionally, after the card reader auxiliary device opens its contactless field, the method further includes:
- step 101-1, the card reader auxiliary device sends a card type request instruction to the card;
- step 101-2, the card reader auxiliary device determines whether card type data returned from the card is received in a third preset time, if yes, executes step 101-3; otherwise, procedure is ended; and
- step 101-3, the card reader auxiliary device determines whether the card is fingerprint card according to received card type data, if yes, executes step 102; otherwise, procedure is ended.

Optionally, the card reader auxiliary device detects whether a card exists specifically includes: the card reader auxiliary device detects whether a card exists via a sensor.

Embodiment 2

Figure 2:
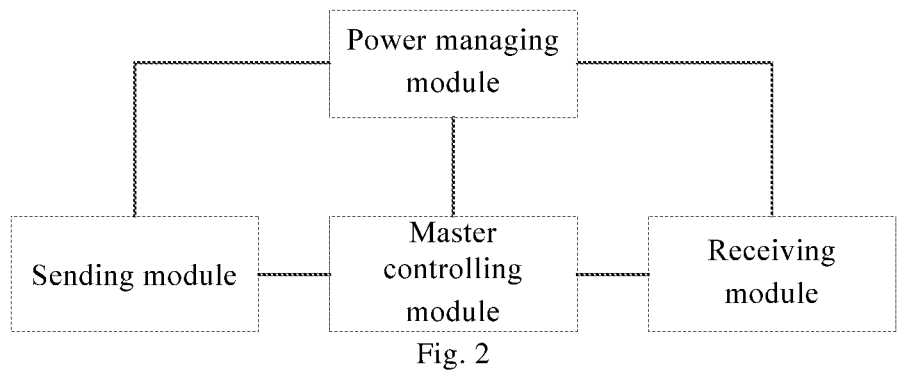
FIG. 2 is a structural block diagram of a card reader auxiliary device provided by Embodiment 2 of the present application.

Embodiment 2 of the present application provides a working method of a card reader auxiliary device. As shown by FIG. 2, which is a structural block diagram of the card reader auxiliary device, where the card reader auxiliary device includes a master controlling module, a sending module, a receiving module and a power managing module; and the card reader auxiliary device is used in an interacting process between a fingerprint card and a card reader, in which the fingerprint card can obtain enough electric energy to perform fingerprint comparison via contactless field provided by the card reader auxiliary device.

Figure 3:
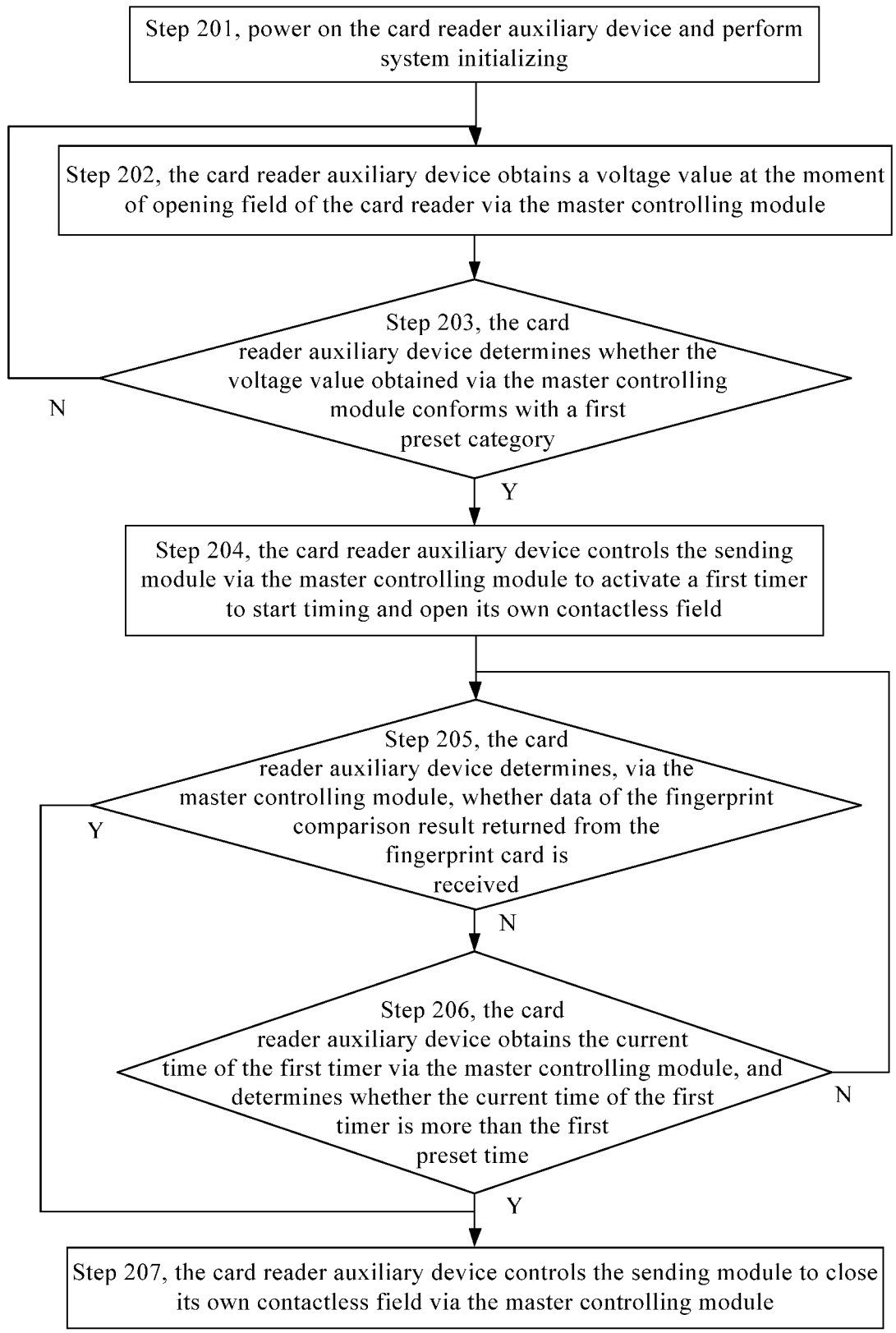
FIG. 3 is a flow chart of a working method of the card reader auxiliary device provided by Embodiment 2 of the present application.

As shown by FIG. 3, a working method of the card reader auxiliary device includes the following.

Step 201, power on the card reader auxiliary device and perform system initializing.

The card reader auxiliary device is powered on specifically is: power is supplied by a power source built in card sleeve of card reader, for example, power is supplied by battery or capacitance.

The card reader auxiliary device is powered on specifically is: power is supplied to the card reader auxiliary device via an external power source, for example, power is supplied to the card reader auxiliary device via an USB interface.

The card reader auxiliary device performs system initializing specifically is: initializing the master controlling module, the sending module and the receiving module in the card reader auxiliary device, and initializing a basic communicating interface, etc.

Step 202, the card reader auxiliary device obtains a voltage value at the moment of opening field of the card reader via the master controlling module.

In the present embodiment, the card reader auxiliary device obtains voltage value at the moment of opening field of the card reader via the master controlling module specifically is: the card reader auxiliary device generates alternating current through a way which is that the contactless coil in the card reader auxiliary device induces contactless field generated by the card reader, converts the obtained alternating current to direct current, collects the direct current via the master controlling module to obtain the voltage value.

Specifically, the card reader auxiliary device converts the obtained alternating current to direct current specifically is: converting the alternating current to the direct current via bridge rectifier and its voltage divider.

Specifically, the card reader auxiliary device collects the direct current via the master controlling module to obtain the voltage value specifically is: chip AD acquisition pin in the master controlling module collects the direct current to obtain the voltage value.

Optionally, before step 202, the method further includes: the card reader auxiliary device initializes a timer in the master controlling module, sets timer interruption condition, in case that timer interruption condition is met, the timer is interrupted and the card reader auxiliary device executes step 202.

Specifically, the timer interruption condition is set to be 100 ms.

Step 203, the card reader auxiliary device determines whether the voltage value obtained via the master controlling module conforms with a first preset category, if yes, executes step 204; otherwise, goes back to step 202.

In the present embodiment, the first preset category specifically is: the voltage value is more than or equal to a first preset value and is less than or equal to a second preset value.

The first preset value is 1.5V, and the second preset value is 2.0V.

When the voltage value obtained by the card reader auxiliary device is in the first preset category, the voltage value conforms with the first preset category; otherwise, the voltage value does not conform with the first preset category.

Specifically, the voltage value obtained by the card reader auxiliary device conforms with the first preset category means that a card enters the contactless field; and the voltage value obtained by the card reader auxiliary device does not conform with the first preset category means that no card enters the contactless field.

In the present embodiment, step 202-step 203 can be replaced by:
- the card reader auxiliary device generates alternating current through a way which is that the contactless coil in the card reader auxiliary device induces contactless field generated by the card reader, detects whether change happens to the alternating current via electrode circuit, if change happens, it means that a card exists; and if change does not happen, it means that a card does not exist.

Specifically, two ends of the contactless coil in the card reader auxiliary device are connected to two electrodes respectively, which forms electrode circuit.

In this case, the card reader auxiliary device detects whether change happens to the alternating current via electrode circuit specifically is: the card reader auxiliary device generates alternating current through a way which is that the contactless coil induces contactless field generated by the card reader, transmits the alternating current to two electrodes; one of the two electrodes is connected to the master controlling module, and the master controlling module detects whether change happens to the alternating current going through the electrode; and in case that a card does not exist, the alternating current going through the electrode is fixed, when a card approaches the electrode, the card which is as a carrier moves electric charge at one electrode to the other electrode, therefore alternating current in the electrode circuit is intensified.

In the present embodiment, step 202-step 203 can be substituted by: the card reader auxiliary device detects whether a card exists via a sensor.

Specifically, the card reader auxiliary device detects whether a card exists via a sensor specifically is: the card reader auxiliary device performs the detection through a photoelectric sensor, a Hall sensor, etc.

Step 204, the card reader auxiliary device controls the sending module via the master controlling module to activate a first timer to start timing and open its own contactless field; and executes step 205.

In the present embodiment, the sending module opens its own contactless field specifically is: generating alternating electromagnetic field via contactless coil, inducing contactless coil in the fingerprint card to obtain electric energy, supplying power to the fingerprint card via the electric energy, so as to make the fingerprint card complete fingerprint comparison process.

In the present embodiment, optionally, in case that power is supplied to the card reader auxiliary device by battery, the card reader auxiliary device further includes a battery power charging module, which is for obtaining field strength electric energy to charge the battery when the card reader generates contactless field strength.

Specifically, after the card reader auxiliary device controls the sending module via the master controlling module to open its own contactless field, the method further includes: the master controlling module sends low level to the battery power charging module and closes a function of power charging.

Step 205, the card reader auxiliary device determines, via the master controlling module, whether data of the fingerprint comparison result returned from the fingerprint card is received, if yes, executes step 207; otherwise, executes step 206.

In the present embodiment, optionally, the master controlling module determines whether the data of the fingerprint comparison result received is a preset value, if yes, executes step 207; otherwise, executes step 206.

In this case, the preset value is a bit or preset byte data.

In the present embodiment, optionally, after the master controlling module receives data, before step 207 is executed, the method further includes the following.

Step b1, the master controlling module in the card reader auxiliary device determines status of the received fingerprint comparison result, if the status is success, executes step b2, if the status is failure, executes step 207.

In the present embodiment, the master controlling module in the card reader auxiliary device receives a fingerprint comparison result specifically is: the receiving module in the card reader auxiliary device receives a fingerprint comparison result returned from the fingerprint card via contactless coil, processes the received fingerprint comparison result and sends the processed fingerprint comparison result to the master controlling module.

In this case, the fingerprint comparison result is sent via an internal coil by the fingerprint card.

The master controlling module in the card reader auxiliary device determines status of the received fingerprint comparison result specifically is: the master controlling module determines status of the fingerprint comparison result according to a status code included in the received fingerprint comparison result.

Specifically, when the status code in the received fingerprint comparison result is a first preset code, the master controlling module determines that the status of the received fingerprint comparison result is success; and when the status code in the received fingerprint comparison result is a second preset code, the master controlling module determines that the status of the received fingerprint comparison result is failure.

For example, the first status code is: 9000; and the second status code is: 6985.

Step b2, the card reader auxiliary device controls the sending module to weaken contactless field strength via the master controlling module, activates a second timer to start timing, and execute step b3.

In the present embodiment, the sending module weakens contactless field specifically is generating weaker alternating electromagnetic field via contactless coil.

Specifically, the fingerprint card obtains electric energy through a way which is that the coil in the fingerprint card induces the contactless coil in the card reader auxiliary device, the electric energy supplies power to the fingerprint card which can make the fingerprint card perform a fingerprint comparing process.

Step b3, the card reader auxiliary device obtains a current time of a second timer via the master controlling module, determines whether the current time of the second timer is more than a second preset time, if yes, executes step 207; otherwise, executes step b4.

In the present embodiment, when the card reader auxiliary device determines that the obtained time of the second timer is more than the second preset time, it represents that the time for receiving a communicating result by the card reader auxiliary device is out.

Specifically, the second preset time is 5 s.

Step b4, the card reader auxiliary device determines whether a communicating result returned from the fingerprint card is received via the master controlling module, if yes, executes step 207; otherwise, executes step b3.

In the present embodiment, the master controlling module in the card reader auxiliary device receives a communicating result returned from the fingerprint card specifically is: the receiving module in the card reader auxiliary device receives a communicating result returned from the fingerprint card via the contactless coil, processes the received communicating result returned from the fingerprint card and sends the processed communicating result to the master controlling module.

In this case, the communicating result returned from the fingerprint card is sent by the fingerprint card via the internal coil.

Step 206, the card reader auxiliary device obtains the current time of the first timer via the master controlling module, and determines whether the current time of the first timer is more than the first preset time, if yes, executes step 207; otherwise, goes back to step 205.

In the present embodiment, when the master controlling module in the card reader auxiliary device determines that the current time of the first timer is more than the first preset time, it represents that the time for receiving the fingerprint comparison result by the card reader auxiliary device is out.

Optionally, when the card reader auxiliary device determines that the current time of the first timer is more than the first preset time, the method further includes: the card reader auxiliary device determines whether a heartbeat packet returned from the fingerprint card is received, if yes, resets the timer, and goes back to step 205; otherwise, executes step 207.

Preferably, before the card reader auxiliary device determines whether a heartbeat packet returned from the fingerprint card is received, the method further includes: the card reader auxiliary device sends a heartbeat packet request to the fingerprint card.

Specifically, the first preset time is 10 s.

In the present embodiment, step 205-step 206 can be substituted by the following.

Step 205', the card reader auxiliary device obtains a current time of the first timer via the master controlling module, determines whether the current time is more than a first preset time, if yes, executes step 207; otherwise, keeps on obtaining time of the timer till the time reaches the first preset time.

Preferably, when the card reader auxiliary device determines that the current time is more than a first preset time, the method further includes: the card reader auxiliary device determines whether a heartbeat packet returned from the fingerprint card is received, if yes, resets the timer, and goes back to step 205', otherwise, executes step 207.

Step 207, the card reader auxiliary device controls the sending module to close its own contactless field via the master controlling module.

In the present embodiment, the sending module closes its own contactless field specifically is: the sending module does not generate alternating electromagnetic field.

Optionally, the internal of the fingerprint card includes capacitance; where the capacitance can provide enough electric energy for the fingerprint card when the card reader auxiliary device closes its own contactless field, in this way, the fingerprint card can complete the communicating process with the card reader via the internal coil.

Optionally, after the card reader auxiliary device closes its own contactless field, the method further includes: the card reader auxiliary device obtains a time of the timer, determines whether the time of the timer is equal to a preset waiting time, if yes, ends the procedure; otherwise, keeps on waiting till a preset waiting time is reached.

Preferably, before the card reader auxiliary device obtains the time of the timer, the method further includes: the card reader auxiliary device detects whether a card exists, when the card reader auxiliary device detects that a card exists, the card reader auxiliary device obtains the time of the timer.

Preferably, the card reader auxiliary device detects whether a card exists specifically includes: the card reader auxiliary device determines whether a card exists by sensing change of contactless field strength of the card reader or the card reader auxiliary device detects whether a card exists via electrode circuit.

In the present embodiment, after the card reader auxiliary device opens its own contactless field, the method further includes:

step 204-1, the card reader auxiliary device sends a card type request instruction to the card;

step 204-2, the card reader auxiliary device determines whether card type data returned from the card is received in a third preset time, if yes, executes step 204-3; otherwise, ends the procedure; and step 204-3, the card reader auxiliary device determines whether the card is a fingerprint card according to the received card type data, if yes, executes step 205; otherwise, ends the procedure.

Embodiment 3

Figure 4:
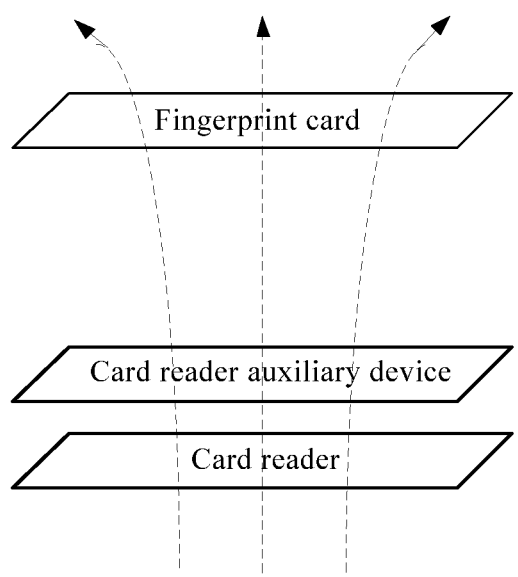
FIG. 4 is a schematic diagram of a working method of a card reader auxiliary device provided by Embodiment 3 of the present application.

Embodiment 3 of the present application provides a working method of a card reader auxiliary device, where the card reader auxiliary device includes a first coil, a second coil, a master controlling module, a sending module and a receiving module; FIG. 4 is a working schematic diagram of the card reader auxiliary device, the card reader auxiliary device is used for an interacting process between a fingerprint card and a card reader; by providing contactless field provided by the card reader auxiliary device, the fingerprint card can obtain electric energy enough for the fingerprint card to perform fingerprint comparison.

Figure 5:
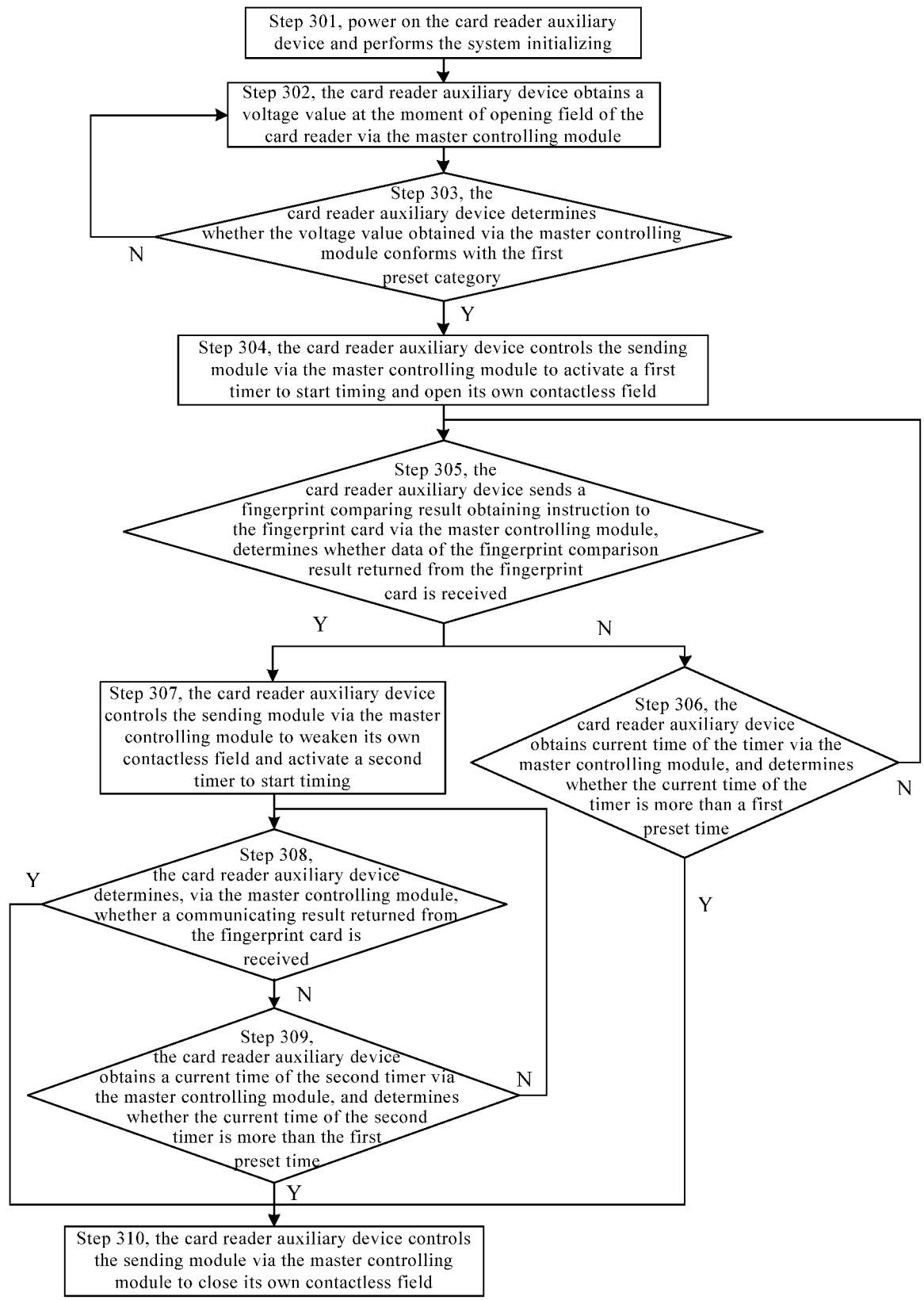
FIG. 5 is a flowchart of the working method of the card reader auxiliary device provided by Embodiment 3 of the present application.
Figure 6:
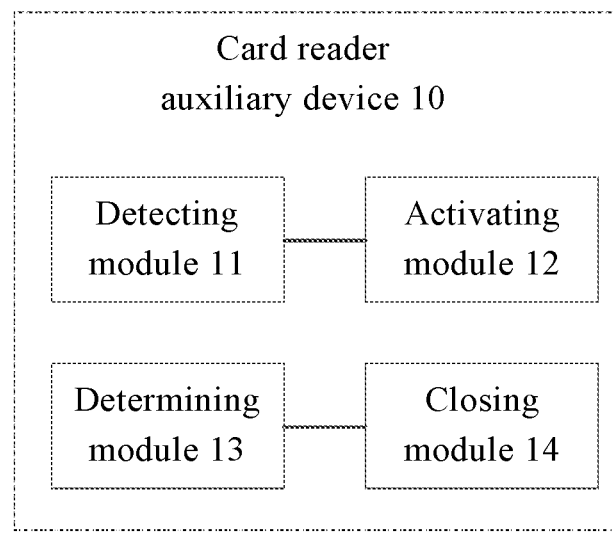
FIG. 6 is a structural block diagram of a card reader auxiliary device provided by Embodiment 4 of the present application.

As shown by FIG. 5, the working method of the card reader auxiliary device includes the following.

Step 301, power on the card reader auxiliary device and performs the system initializing.

In the present embodiment, the card reader auxiliary device is powered on specifically is: power is supplied by a battery built in card sleeve of the card reader.

The card reader auxiliary device performs system initializing specifically is: initializing the master controlling module, the sending module and the receiving module in the card reader auxiliary device, and initializing basic communicating interface, etc.

Step 302, the card reader auxiliary device obtains a voltage value at the moment of opening field of the card reader via the master controlling module.

In the present embodiment, the card reader auxiliary device obtains the voltage value at the moment of opening field of the card reader via the master controlling module specifically is: the card reader auxiliary device generates alternating current through a way which is that the first contactless coil in the card reader auxiliary device induces contactless field strength generated by the card reader, converts the obtained alternating current to direct current, and collects the direct current via the master controlling module to obtain the voltage value.

Specifically, the card reader auxiliary device converts the obtained alternating current to direct current specifically is: converting the obtained alternating current to direct current via bridge rectifier and its voltage divider.

Specifically, the collecting the direct current via the master controlling module to obtain the voltage value specifically is: a chip AD acquisition pin of the master controlling module collects the direct current to obtain the voltage value.

Optionally, before step 302, the method further includes: the card reader auxiliary device initializes a timer in the master controlling module, sets timer interruption condition, when the timer interruption condition is met, the timer interrupts, the card reader auxiliary device executes step 302.

Specifically, the timer interruption condition can be set to be 100 ms.

Step 303, the card reader auxiliary device determines whether the voltage value obtained via the master controlling module conforms with the first preset category, if yes, executes step 304; otherwise, goes back to step 302.

In the present embodiment, the first preset category specifically is: the voltage value is more than or equal to a first preset value and is less than or equal to a second preset value.

In this case, the first preset value is 1.5V; and the second preset value is 2.0V.

When the voltage value obtained by the card reader auxiliary device is in the first preset category, the voltage value conforms with the first preset category, otherwise, the voltage value does not conform with the first preset category.

Specifically, the voltage value obtained by the card reader auxiliary device conforms with the first preset category represents that a card enters the contactless field; and the voltage value obtained by the card reader auxiliary device does not conform with the first preset category represents that no card enters the contactless field.

Step 304, the card reader auxiliary device controls the sending module via the master controlling module to activate a first timer to start timing and open its own contactless field, and executes step 305.

In the present embodiment, the sending module opens its own contactless field specifically is generating alternating electromagnetic field via the second coil.

Specifically, the fingerprint card obtains electric energy through a way which is that the internal coil of the fingerprint card induces the second coil in the card reader auxiliary device; and the electric energy supplies power to the fingerprint card, which makes the fingerprint card to complete fingerprint comparison process.

In the present embodiment, the card reader auxiliary device further includes a battery charging module, where the battery charging module is used for obtaining power to charge battery when the card reader generates contactless field strength.

Specifically, after the card reader auxiliary device controls the sending module via the master controlling module to open its own contactless field, the method further includes: the master controlling module sends a low level signal to the battery charging module and closes the charging function.

Step 305, the card reader auxiliary device sends a fingerprint comparing result obtaining instruction to the fingerprint card via the master controlling module, determines whether data of the fingerprint comparison result returned from the fingerprint card is received, if yes, executes step 307; otherwise, executes step 306.

Step 306, the card reader auxiliary device obtains the current time of the timer via the master controlling module, and determines whether the current time of the timer is more than a first preset time, if yes, executes step 310; otherwise, executes step 305.

Preferably, when the card reader auxiliary device determines that the current time is more than a first preset time, the method further includes: the card reader auxiliary device determines whether a heartbeat packet returned from the fingerprint card is received, if yes, resets the timer, and goes back to step 305; otherwise, executes step 310.

Step 307, the card reader auxiliary device controls the sending module via the master controlling module to weaken its own contactless field and activate a second timer to start timing, and executes step 308.

In the present embodiment, the sending module weakens the contactless field specifically is generating weaker alternating electromagnetic field via the second contactless coil.

Specifically, the fingerprint card obtains electric energy through a way which is that its internal coil induces the second contactless coil in the card reader auxiliary device, supplies power to the fingerprint card via the electric energy, in this way the fingerprint card completes communicating with the card reader.

Step 308, the card reader auxiliary device determines, via the master controlling module, whether a communicating result returned from the fingerprint card is received, if yes, executes step 310; otherwise, executes step 309.

In the present embodiment, the master controlling module in the card reader auxiliary device receives a communicating result returned from the fingerprint card specifically is: the receiving module in the card reader auxiliary device receives a communicating result returned from the fingerprint card via the contactless coil, and processes the received communicating result returned from the fingerprint card and sends the processed communicating result to the master controlling module.

In this case, the communicating result returned from the fingerprint card is sent via the internal coil of the fingerprint card.

Step 309, the card reader auxiliary device obtains a current time of the second timer via the master controlling module, and determines whether the current time of the second timer is more than the first preset time, if yes, executes step 310; otherwise, executes step 308.

In the present embodiment, when the card reader auxiliary device determines that the obtained time of the second timer is more than the first preset time, it represents that the time for receiving a communicating result by the card reader auxiliary device is out.

Specifically, the first preset time is 10 s.

Step 310, the card reader auxiliary device controls the sending module via the master controlling module to close its own contactless field.

In the present embodiment, the sending module closes its own contactless field specifically is: the sending module does not generate alternating electromagnetic field.

Optionally, the fingerprint card includes capacitance inside, where the capacitance can supply enough power to the fingerprint card when the card reader auxiliary device closes its own contactless field, in this way the fingerprint card can complete a communicating process with the card reader via the internal coil.

Embodiment 4

Embodiment 4 of the present application provides a card reader auxiliary device 10, where the card reader auxiliary device 10 includes:
- a detecting module 11, configured to detect whether a card exists based on contactless field of a card reader;
- an activating module 12, configured to activate a timer and open own contactless field of the card reader auxiliary device when the detecting module 11 detects the card exists;
- a determining module 13 which includes a first determining unit;
- the first determining unit is configured to obtain time of the timer and determine whether the time of the timer is more than a first preset time; and
- a closing module 14, configured to close the contactless field of the card reader auxiliary device when the determining module 13 determines that the time of the timer is more than the first preset time.

Optionally, the determining module 13 specifically further includes a second determining unit;

the second determining unit is configured to determine whether data of the fingerprint comparison result returned from the fingerprint card is received; and the closing module 14 is further configured to close the contactless field of the card reader auxiliary device when the second determining unit determines that the data of the fingerprint comparing result returned from the fingerprint card is received.

Optionally, the device further includes a sending module, configured to send a fingerprint comparing result obtaining instruction to the fingerprint card.

Optionally, the device further includes a resetting module; in this case, the determining module 13 specifically further includes a third determining unit; where the third determining unit is configured to determine whether a heartbeat packet returned from a fingerprint card is received when the first determining unit determines that time of the timer is more than a first preset time;

the resetting module is configured to reset the timer when the third determining unit determines that a heartbeat packet returned from the fingerprint card is received; and the closing module 14 is further configured to close the contactless field of the card reader auxiliary device when the third determining unit determines that the current time is more than a first preset threshold value.

Preferably, the determining module 13 further includes a first sending unit, configured to send a heartbeat packet request to the fingerprint card.

Optionally, the determining module 13 specifically further includes a fourth determining unit, configured to determine whether the card is out of the field; and the closing module 14 is further configured to close the contactless field of the card reader auxiliary device when the fourth determining unit determines that the card is out of the field.

Optionally, the determining module 13 specifically includes a fifth determining unit and a sixth determining unit;

the activating module 12 is further configured to activate a second timer;

the fifth determining unit is configured to determine whether a result of communicating with the card reader returned from the fingerprint card is received;

the closing module 14 is further configured to close contactless field of the card reader auxiliary device in case that the fifth determining unit determines that a result of communicating with the card reader returned from a fingerprint card is received;

the sixth determining unit is configured to obtain a current time of the second timer in case that the fifth determining unit determines that a result of communicating with the card reader returned from a fingerprint card is not received and determine whether the current time of the second timer is more than a third preset threshold value; and the closing module 14 is further configured to close the contactless field in case that the sixth determining unit determines that the current time of the second timer is more than the third preset threshold value.

Preferably, the activating module 12 is configured to activate a second timer, specifically, further configured to weaken the contactless field of the card reader auxiliary device.

Optionally, the determining module 13 specifically further includes a seventh determining unit; where the seventh determining unit is configured to obtain time of the timer, determine whether the time of the timer is equal to a preset waiting time.

Preferably, the detecting module 11 is further configured to detect whether a card exists when the closing module 14 closes the contactless field, trigger a seventh determining unit in case that the detecting module 11 detects that a card exists.

Optionally, the detecting module 11 is specifically configured to detect whether a card exists via sensing change of contactless field strength of the card reader; and the detecting module 11 is further configured to detect whether a card exists via electrode circuit.

Preferably, the detecting module 11 is specifically configured to determine whether a card exists via sensing change of contactless field strength of the card reader, specifically: the detecting module 11 is configured to generate alternating current through a way which is that the contactless coil in the card reader auxiliary device induces contactless field generated by the card reader, convert the alternating current to direct current, measure voltage value of the card reader auxiliary device, determine whether the voltage value conforms with a first preset category, if yes, the detecting module 11 determines that a card exists, otherwise, the detecting module 11 determines that a card does not exist.

Preferably, the detecting module 11 is specifically further configured to detect whether a card exists by detecting electrode circuit, specifically, the detecting module 11 is specifically configured to generate alternating current through a way which is that the contactless coil in the card reader auxiliary device induces contactless field generated by the card reader, detect whether change of the alternating current happens via electrode circuit, if change happens, the detecting module 11 determines that a card exists; otherwise, the detecting module 11 determines that a card does not exist.

Preferably, the device further includes an initializing module, configured to initialize a timer, set a timer interruption condition, when the timer interruption condition is met, trigger the detecting module 11.

Optionally, the device further includes a sending module, the determining module 13 specifically further includes an eighth determining unit and a ninth determining unit;

the sending module is configured to send a card type request instruction to the card when the closing module 14 closes the contactless field;

the eighth determining unit is configured to determine whether card type data returned from the card is received in a second preset time; and the ninth determining unit is configured to determine whether the card is a fingerprint card in case that the eighth determining unit determines that the card type data returned from the card is received in the second preset time.

Optionally, the detecting module 11 is specifically configured to detect whether a card exists via a sensor.

An optional embodiment of the application also provides a card reader auxiliary device, which includes:

a detector, configured to detect whether a card exists based on contactless field of a card reader;

a processor, configured to activate a timer in case that the detector detects that the card exists, and open contactless field of the card reader auxiliary device;

where the processor is further configured to obtain a time of the timer, and determine whether the time of the timer is more than a first preset time; and the processor is further configured to close the contactless field of the card reader auxiliary device in case of determining that the time of the timer is more than the first preset time.

Optionally, the processor is specifically configured to:
determine whether data of a fingerprint comparing result returned from a fingerprint card is received; and
close the contactless field of the card reader auxiliary device in case that the data of the fingerprint comparing result returned from the fingerprint card is received.

Optionally, the device further includes a first sender, configured to send a fingerprint comparing result obtaining instruction to the fingerprint card.

Optionally, the processor is specifically configured to:
determine whether a heartbeat packet returned from a fingerprint card is received in case of determining that a current time is more than a first preset time; and
reset the timer in case that the heartbeat packet returned from the fingerprint card is received;
where the processor is specifically further configured to close the contactless field of the card reader auxiliary device in case of determining that the heartbeat packet returned from the fingerprint card is not received.

Optionally, the device further includes a second sender, configured to send a heartbeat packet request to the fingerprint card.

Optionally, the processor is further configured to:
determine whether the card is out of field; and
close the contactless field of the card reader auxiliary device in case of determining that the card is out of the field.

Optionally, the processor is further configured to:
activate a second timer;
determine whether a result of communicating with the card reader returned from a fingerprint card is received;
close the contactless field of the card reader auxiliary device in case of determining that a result of communicating with the card reader returned from the fingerprint card is received;
obtain a current time of the second timer in case of determining that the result of communicating with the card reader returned from the fingerprint card is not received and determine whether the current time of the second timer is more than a third preset threshold value; and
close the contactless field of the card reader auxiliary device in case of determining that the current time of the second timer is more than the third preset threshold value.

Optionally, the processor is further configured to:
obtain the time of the timer and determine whether the time of the timer is equal to a preset waiting time period.

Optionally, the detector is specifically configured to determine whether the card exists by sensing change of contactless field strength of the card reader; and the detector is specifically further configured to detect whether the card exists via electrode circuit.

Optionally, the device further includes a sender; where the sender is configured to send a card type request instruction to the card when the processor closes the contactless field of the card reader auxiliary device;
where the processor is further configured to determine whether card type data returned from the card is received in a second preset time; and the processor is further configured to determine whether the card is a fingerprint card in case that the card type data returned from the card is received in the second preset time.

The beneficial effects of technical solutions provided by the embodiments of the present application are: in the present application, the card reader auxiliary device determines whether a fingerprint card exists via detecting voltage of opening field of a card reader, when the fingerprint card exists, the card reader auxiliary device provides enough field strength for the fingerprint card, which makes the fingerprint card complete fingerprint comparison; and the card reader auxiliary device weakens its own field strength after receiving a fingerprint comparison result, which make the fingerprint card communicates with the card reader smoothly. According to the present application, the card reader can complete fingerprint comparison at first, then ensure that communication with the card is valid; therefore, the field strength of the card reader is enhances indirectly and communication is safer.

The card reader auxiliary device and the working method thereof provided by the present application are introduced in detail above. Specific examples are used herein to explain the principle and implementation of the present application. The above description of the embodiments is merely to assist in understanding the method of the present application and its core idea. At the same time, one of ordinary skill in the art might make modifications on specific implementations or its application scope according to the idea of the present application. Thus, the contents of the description should not be interpreted as restrictions on the present application.

The invention claimed is:

1. A method of operation of a card reader auxiliary device, the card reader auxiliary device depending on a card reader, comprising:
step S1, detecting, by the card reader auxiliary device, whether a card exists based on contactless field of the card reader, activating a timer when detecting that the card exists, and opening contactless field of the card reader auxiliary device;
step S2, obtaining, by the card reader auxiliary device, a current time of the timer, determining whether the current time is more than a first preset time, if yes, executing step S3; otherwise, going back to execute step S2; and
step S3, closing, by the card reader auxiliary device, the contactless field of the card reader auxiliary device;
wherein before obtaining, by the card reader auxiliary device, the current time of the timer in step S2, the method further comprises: determining, by the card reader auxiliary device, whether data of a fingerprint comparing result returned from a fingerprint card is received, and, if yes, executing step S3; otherwise, executing step S2.

2. The method according to claim 1, wherein before determining, by the card reader auxiliary device, whether the data of the fingerprint comparing result returned by the fingerprint card is received in step S2, the method further comprises: sending, by the card reader auxiliary device, a fingerprint comparing result obtaining instruction to the fingerprint card.

3. The method according to claim 1, wherein in case that the card reader auxiliary device determines that the current time is more than the first preset time, the method further comprises: determining, by the card reader auxiliary device, whether a heartbeat packet returned from a fingerprint card is received, and, if yes, resetting the timer, and going back to step S2; otherwise, closing the contactless field of the card reader auxiliary device.

4. The method according to claim 3, wherein before determining, by the card reader auxiliary device, whether the heartbeat packet returned from the fingerprint card is received, the method further comprises: sending, by the card reader auxiliary device, a heartbeat packet request to the fingerprint card.

5. The method according to claim 1, wherein step S3 further comprises: determining, by the card reader auxiliary device, whether the card is out of field, and, if yes, closing the contactless field of the card reader auxiliary device.

6. The method according to claim 1, wherein step S3 further comprises:
   step A1, activating, by the card reader auxiliary device, a second timer;
   step A2, determining, by the card reader auxiliary device, whether a result of communicating with the card reader returned from a fingerprint card is received, and, if yes, closing the contactless field of the card reader auxiliary device, otherwise, executing step A3; and
   step A3, obtaining, by the card reader auxiliary device, a current time of the second timer, determining whether the current time of the second timer is more than a fourth preset time, and, if yes, closing the contactless field of the card reader auxiliary device; otherwise, executing step A2.

7. The method according to claim 1, wherein after closing, by the card reader auxiliary device, the contactless field of the card reader auxiliary device, the method further comprises: obtaining, by the card reader auxiliary device, a time of the timer, determining whether the time of the timer is equal to a preset waiting time period, and, if yes, ending; otherwise, keeping waiting till reaching the preset waiting time period.

8. The method according to claim 1, wherein detecting, by the card reader auxiliary device, whether a card exists comprises: determining, by the card reader auxiliary device, whether the card exists via sensing change of contactless field strength of the card reader or detecting, by the card reader auxiliary device, whether the card exists via electrode circuit.

9. The method according to claim 1, wherein after opening, by the card reader auxiliary device, the contactless field of the card reader auxiliary device, the method further comprises:
   step S1-1, sending, by the card reader auxiliary device, a card type request instruction to the card;
   step S1-2, determining, by the card reader auxiliary device, whether card type data returned from the card is received in a fifth preset time, and, if yes, executing step S1-3; otherwise, ending; and
   step S1-3, determining, by the card reader auxiliary device, whether the card is a fingerprint card according to received card type data, and, if yes, executing step S2; otherwise, ending.

10. A card reader auxiliary device, comprising:
    a detector configured to detect whether a card exists based on contactless field of a card reader; and
    a processor configured to activate a timer in case that the detector detects that the card exists, and open contactless field of the card reader auxiliary device;
    wherein the processor is further configured to obtain a time of the timer, and determine whether the time of the timer is more than a first preset time; and
    the processor is further configured to close the contactless field of the card reader auxiliary device when determining that the time of the timer is more than the first preset time;
    wherein the processor is configured to: determine whether data of a fingerprint comparing result returned from a fingerprint card is received; and
    close the contactless field of the card reader auxiliary device when the data of the fingerprint comparing result returned from the fingerprint card is received.

11. The device according to claim 10, wherein the device further comprises a first sender, configured to send a fingerprint comparing result obtaining instruction to the fingerprint card.

12. The device according to claim 10, wherein the processor is configured to: determine whether a heartbeat packet returned from a fingerprint card is received when determining that a current time is more than a first preset time; and
    reset the timer in case that the heartbeat packet returned from the fingerprint card is received;
    wherein the processor is further configured to close the contactless field of the card reader auxiliary device when determining that the heartbeat packet returned from the fingerprint card is not received.

13. The device according to claim 12, further comprising a second sender, configured to send a heartbeat packet request to the fingerprint card.

14. The device according to claim 10, wherein the processor is further configured to:
    determine whether the card is out of field; and
    close the contactless field of the card reader auxiliary device when determining that the card is out of the field.

15. The device according to claim 10, wherein the processor is further configured to:
    activate a second timer;
    determine whether a result of communicating with the card reader returned from a fingerprint card is received;
    close the contactless field of the card reader auxiliary device when determining that a result of communicating with the card reader returned from the fingerprint card is received;
    obtain a current time of the second timer when determining that the result of communicating with the card reader returned from the fingerprint card is not received and determine whether the current time of the second timer is more than a third preset threshold value; and
    close the contactless field of the card reader auxiliary device when determining that the current time of the second timer is more than the third preset threshold value.

16. The device according to claim 10, wherein the processor is further configured to:
    obtain the time of the timer and determine whether the time of the timer is equal to a preset waiting time period.

17. The device according to claim 10, wherein the detector is configured to determine whether the card exists by sensing change of contactless field strength of the card reader; and the detector is further configured to detect whether the card exists via electrode circuit.

18. The device according to claim 10, wherein the device further comprises a sender; and the sender is configured to send a card type request instruction to the card when the processor closes the contactless field of the card reader auxiliary device;

wherein the processor is further configured to determine whether card type data returned from the card is received in a second preset time; and the processor is further configured to determine whether the card is a fingerprint card in case that the card type data returned from the card is received in the second preset time.

* * * * *